G. CHRISTENSON.
PISTON PACKING EXPANDER.
APPLICATION FILED AUG. 21, 1916.

1,222,363.

Patented Apr. 10, 1917.

Inventor
George Christenson
By his Attorney

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

PISTON-PACKING EXPANDER.

1,222,363.   Specification of Letters Patent.   Patented Apr. 10, 1917.

Application filed August 21, 1916. Serial No. 116,096.

*To all whom it may concern:*

Be it known that I, GEORGE CHRISTENSON, a citizen of the United States of America, residing at Jamaica, county of Queens, State of New York, have invented certain new and useful Improvements in Piston-Packing Expanders, of which the following is a specification.

My invention relates to devices for expanding flexible packing for pistons such as are used in air brake cylinders, and comprises certain improvements on, or modifications of, the structure shown in my U. S. Patent No. 862,540, dated Aug. 6, 1907. The best form of apparatus embodying my present invention now known to me is illustrated in the accompanying sheet of drawings in which—

Figure 1:
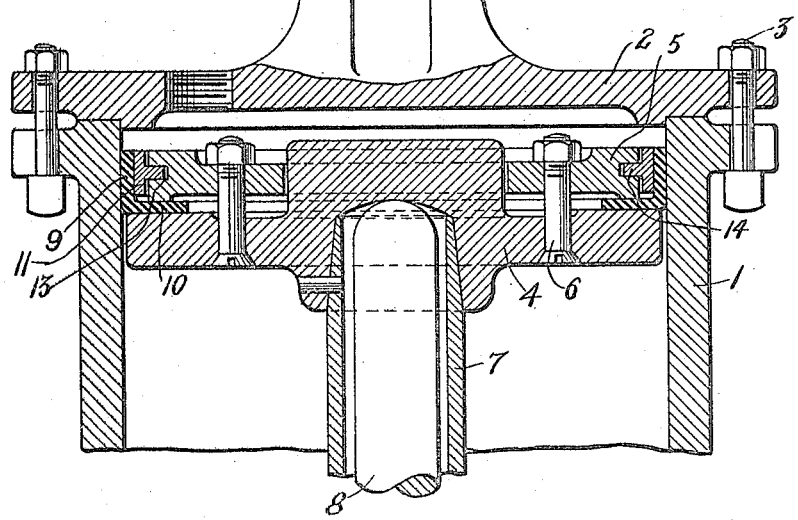
Figure 2:
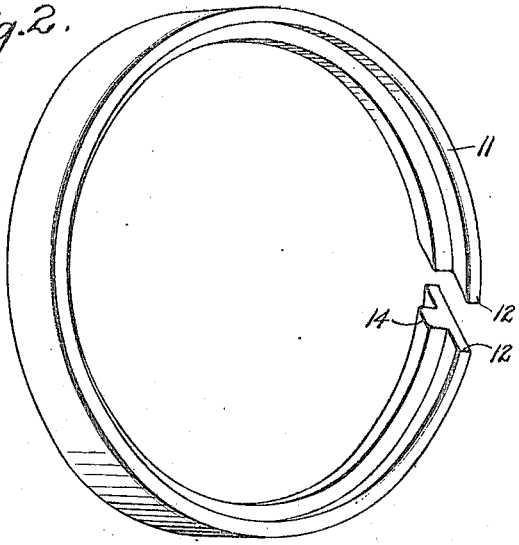

Figure 1 is an axial section of an air brake cylinder and piston with my invention applied thereto, parts being broken away and Fig. 2 is a perspective view of the spring split-ring expander of T-shaped cross section.

Throughout the drawings like reference characters indicate like parts. 1, is a portion of the ordinary air brake cylinder having the head 2, fastened to it by bolts 3. 4, is a piston head; 5, the piston follower, and 6, one of the bolts which fasten the head and follower together to form the usual piston structure. 7, is the usual form of hollow piston rod used in freight brake equipment, set in the piston head 4, and 8, the usual push rod. The usual form of cup leather packing is shown in Fig. 1, formed of a strip of leather or other flexible material having the cylindrical outer portion 9, and the inwardly bent ring-shape inner edge portion 10.

The foregoing parts are of usual construction except that the piston follower 5, is cut away on its cylindrical surface more than usual and has the circumferential groove 13, formed in its remaining body.

11, is a packing expander composed of a spring split-ring of T-shaped cross section with the shank of the T pointing radially inward and the head of the T forming a cylindrical surface which presses against the interior of the portion 9, of the cup leather. 14, is a tongue formed by the shank of the T of ring cross section which fits somewhat loosely in the groove 13, in the piston follower, the described construction forming a tongue-and-groove connection between the packing expander and the piston structure which serves as a retainer for the packing expander and guide therefor. As shown in Fig. 2, the ends 12, 12, of the ring 11, are normally separated, but when the ring is in position, as shown in Fig. 1, the ends are forced more nearly together, and the tendency of the ring to expand forces the leather packing against the sides of the cylinder.

The advantages of my invention over prior forms of piston packing expander comprise the broad area of outward pressure exerted on the inner surface of the packing leather resulting from the wide face of ring 11, the low cost of manufacture resulting from the fact that the rib 13 gives sufficient elasticity to a ring formed of a low grade cast steel, and the location of the pressure surface solely against the cylindrical portion 9 of the cup leather and up to the extreme edge thereof. These features of operation of my present invention avoid the tendency of packing leathers to curl back at the edge, and to wear through at the junction of portions 9 and 10, as the result of the pressure of the expander being localized at that point, in most previous structures.

Having described my invention, I claim:

1. The combination with the usual piston structure and band of flexible packing thereon, of a spring split-ring of T-shaped cross section within said packing, the shank of the T projecting radially inward and the piston structure being grooved circumferentially to receive said shank.

2. The combination with the usual piston head, piston follower and cup leather packing having its inner edge clamped between the two, of a spring split-ring of T-shaped cross section within the packing, the piston follower being grooved to receive and guide the shank of the T.

GEORGE CHRISTENSON.

Copies of this patent may be obtained for five cents each, by addressing the "Commissioner of Patents, Washington, D. C."